No. 667,913. Patented Feb. 12, 1901.
H. N. KIRK.
PLUMBER'S APPLIANCE.
(Application filed Nov. 30, 1900.)
(No Model.)

WITNESSES:
A. R. Appleman
J. B. Owens.

INVENTOR
Herbert N. Kirk
BY
ATTORNEYS

UNITED STATES PATENT OFFICE.

HERBERT NORRIS KIRK, OF KEENE, NEW HAMPSHIRE.

PLUMBER'S APPLIANCE.

SPECIFICATION forming part of Letters Patent No. 667,913, dated February 12, 1901.

Application filed November 30, 1900. Serial No. 38,164. (No model.)

*To all whom it may concern:*

Be it known that I, HERBERT NORRIS KIRK, a citizen of the United States, and a resident of Keene, in the county of Cheshire and State of New Hampshire, have invented a new and Improved Plumber's Appliance, of which the following is a full, clear, and exact description.

The purpose of this invention is to provide an instrument which may be employed readily and effectively to clear the outlet-passages of sinks, bath-tubs, and like devices of solid matter which may accumulate therein and stop the passage.

To this end the invention comprises a special form of nozzle, the construction of which will be fully disclosed hereinafter.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1:
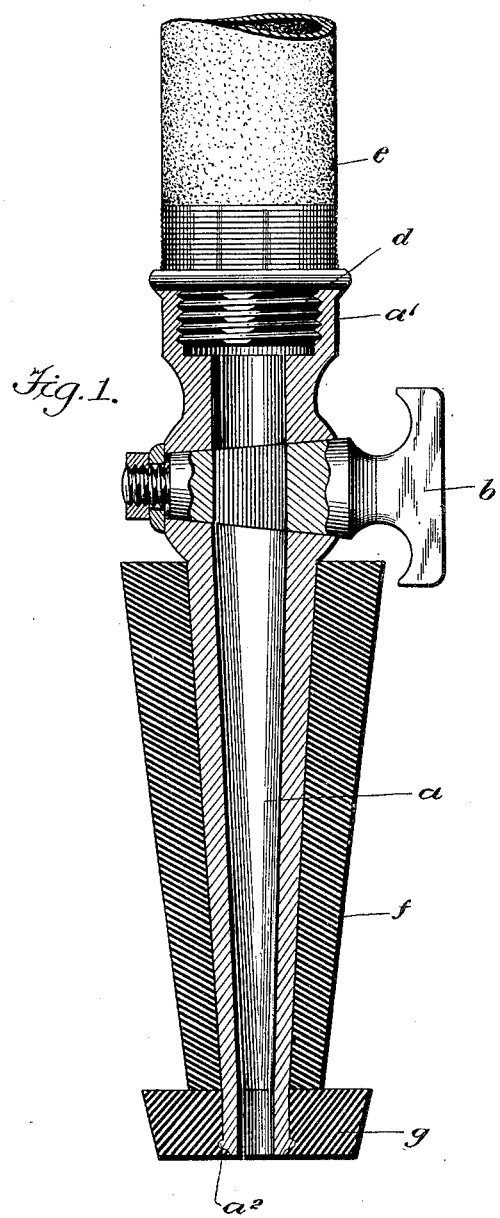
Figure 2:
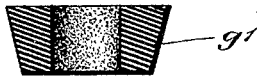

Figure 1 is a sectional view of the invention, and Fig. 2 is a detail section of one of the parts.

The device comprises a tapering nozzle $a$ of essentially the usual form, provided with a cock $b$ and having an internally-threaded socket $a'$, adapted to form part of a connection $d$, by which the hose $e$, leading from a source of water-supply, is attached to the nozzle $a$. Around the tapering nozzle $a$ is fitted securely a tapering sleeve $f$, of tough rubber, the outer end of which projects adjacent to, but not beyond, the outer or small end of the nozzle $a$. Said end of the nozzle is formed with an annular external rib $a^2$, and this serves removably to hold in place a tough-rubber washer $g$. The washer $g$ may be constructed in various sizes. For example, the large size shown in Fig. 1 may be used in connection with the discharge-openings of bath-tubs and other appliances to which such large size is fitted, and for smaller openings a smaller form of the washer ($g'$ in Fig. 2) may be employed.

In using the invention if the discharge-pipe of a sink-basin or bath-tub is clogged a washer $g$ of suitable size should be fitted to the end of the nozzle and this washer inserted in the discharge-opening. Then by manipulating the cock $b$ the water supplied to the hose $e$ may be turned on and the obstruction forced out of the discharge-pipe. Should it be desired to clear out a pipe which is not attached to a basin or the like, the washer $g$ may be removed and the sleeve $f$ inserted in the end of the pipe. The operation is then the same as that described above. It will be obvious that the parts $f$ and $g$ may be used at one time or another, according to the exigencies of the occasion, and it is not considered necessary to embody in this specification a description of the numerous manners of using the device.

Having thus described my invention, I claim as new and desire to secure by Letters Patent—

1. A plumber's appliance, comprising a tapering nozzle, a yielding sleeve fitted thereon, and a yielding washer removably secured to the end of the nozzle adjacent to the sleeve.

2. A plumber's appliance, comprising a nozzle, a sleeve of yielding material mounted on the nozzle and extending to a point adjacent to the end thereof, and a yielding washer fastened on the end of the nozzle adjacent to the sleeve.

In testimony whereof I have signed my name to this specification in the presence of two subscribing witnesses.

HERBERT NORRIS KIRK.

Witnesses:
 CYRUS S. MOORE,
 FRANK H. WHITCOMB.